(12) United States Patent
Fredrickson

(10) Patent No.: US 10,388,942 B2
(45) Date of Patent: Aug. 20, 2019

(54) BATTERY GRID PASTING MACHINE

(71) Applicant: MAC Engineering and Equipment Company, Inc., Benton Harbor, MI (US)

(72) Inventor: Roy A. Fredrickson, Bridgeman, MI (US)

(73) Assignee: MAC Engineering and Equipment Company, Inc., Benton, MI (US)

(*) Notice: Subject to any disclaimer, the term of this patent is extended or adjusted under 35 U.S.C. 154(b) by 100 days.

(21) Appl. No.: 15/690,819

(22) Filed: Aug. 30, 2017

(65) Prior Publication Data

US 2019/0067673 A1 Feb. 28, 2019

(51) Int. Cl.
*H01M 4/04* (2006.01)
*H01M 4/72* (2006.01)

(52) U.S. Cl.
CPC ........... *H01M 4/0404* (2013.01); *H01M 4/72* (2013.01)

(58) Field of Classification Search
CPC ............................... H01M 4/0404; H01M 4/72
See application file for complete search history.

(56) References Cited

U.S. PATENT DOCUMENTS

| | | | |
|---|---|---|---|
| 4,074,733 A | 2/1978 | Gray et al. | |
| 7,513,136 B2 | 4/2009 | Laliberte et al. | |
| 7,700,019 B2 | 4/2010 | Lavoie et al. | |
| 7,882,622 B2 | 2/2011 | Polsonetti et al. | |
| 8,272,408 B2 * | 9/2012 | Fredrickson | H01M 4/73 141/1.1 |
| 2011/0311854 A1 | 12/2011 | Takeuchi et al. | |

FOREIGN PATENT DOCUMENTS

| | | |
|---|---|---|
| CN | 103730640 A | 4/2014 |
| GB | 1428677 A | 3/1976 |
| JP | S5574058 A | 6/1980 |
| JP | S5590065 A | 7/1980 |
| JP | S60160564 A | 8/1985 |
| JP | H13252051 A | 11/1991 |

* cited by examiner

*Primary Examiner* — Jason K Niesz
(74) *Attorney, Agent, or Firm* — Barnes & Thornburg LLP

(57) ABSTRACT

A battery grid pasting machine includes a support structure, a battery grid plate support for supporting a battery grid plate, a paste dispensing hopper, a height adjustment mechanism for adjusting the spacing between the hopper and the battery grid plate support and a control system. The height adjustment mechanism includes a hydraulic cylinder connected to the hopper and a position sensor for sensing the position of the hydraulic cylinder. The control system includes a first hydraulic pump and a first hydraulic valve associated with the first hydraulic pump for incrementally moving the hydraulic cylinder by a first specified distance and a second hydraulic pump and a second hydraulic valve associated with the second hydraulic pump for incrementally moving the hydraulic cylinder by a second specified distance.

14 Claims, 5 Drawing Sheets

BATTERY GRID PASTING MACHINE

BACKGROUND

The present invention relates to battery grid pasting machines, and, in particular, to a battery grid pasting machine with an adjustable hopper.

One known method of producing battery plates utilizes a pasting machine to apply lead oxide paste to a lead grid or matrix. Such pasting machines may use a hopper that dispenses lead oxide paste onto battery grids moving along a conveyor belt positioned underneath the hopper. One known pasting machine of this type is disclosed in U.S. Pat. No. 8,272,408.

SUMMARY OF THE INVENTION

In one embodiment of the present invention, a battery grid pasting machine includes a support structure, a battery grid plate support for supporting a battery grid plate, a paste dispensing hopper connected to the support structure, a height adjustment mechanism and a control system. The hopper has an inlet end and an outlet end and is located above the battery grid plate support with the outlet spaced apart from the battery grid plate support. The height adjustment mechanism adjusts the spacing between the outlet end of the hopper and the battery grid plate support and includes a first hydraulic cylinder, a first bracket connecting the first hydraulic cylinder to the hopper adjacent the inlet end of the hopper, a first position sensor for sensing the position of the first hydraulic cylinder, a second hydraulic cylinder, a second bracket for connecting the second hydraulic cylinder to the hopper adjacent the outlet end of the hopper and a second position sensor for sensing the position of the second hydraulic cylinder. The battery grid pasting machine further includes a pivot shaft about which the hopper pivots. The pivot shaft is connected to the support structure and extends through a slot in the second bracket. At least one pivot arm is connected to the pivot shaft and a second shaft extends through a slot in the pivot arm and is connected to the second bracket such that rotation of the pivot shaft rotates the pivot arm so as to bear against the second shaft, thereby causing the hopper to pivot. The control system controls the height adjustment mechanism and includes a microprocessor, a first pair of hydraulic pumps and a first pair of hydraulic valves associated with the first pair of hydraulic pumps for incrementally moving the first and second hydraulic cylinders by a first specified distance and a second pair of hydraulic pumps and a second pair of hydraulic valves associated with the second pair of hydraulic pumps for incrementally moving the first and second hydraulic cylinders by a second specified distance that is less than the first specified distance.

In one embodiment of the invention, the hopper moves vertically independent of the pivot shaft. In another embodiment of the invention, the hopper moves vertically independent of the pivot arm.

In one embodiment of the invention, the battery grid plate support includes a conveyor belt.

In another embodiment of the present invention, a battery grid pasting machine includes a support structure, a battery grid plate support for supporting a battery grid plate, a paste dispensing hopper, a height adjustment mechanism for adjusting the spacing between the hopper and the battery grid plate support and a control system. The height adjustment mechanism includes a hydraulic cylinder connected to the hopper and a position sensor for sensing the position of the hydraulic cylinder. The control system includes a first hydraulic pump and a first hydraulic valve associated with the first hydraulic pump for incrementally moving the hydraulic cylinder by a first specified distance and a second hydraulic pump and a second hydraulic valve associated with the second hydraulic pump for incrementally moving the hydraulic cylinder by a second specified distance.

In one embodiment of the invention, the first specified distance is greater than the second specified distance.

In another embodiment of the invention, the control system further includes a microprocessor.

According to another embodiment of the invention, a check valve associated with the hydraulic cylinder.

In yet another embodiment of the invention, the hopper is pivotally connected to the support structure. The hopper includes an inlet end and an outlet end and the hopper can be pivotally connected to the support structure adjacent the outlet end. The battery grid pasting machine may further include a pivot shaft connected to the support structure. In one embodiment, at least one pivot arm is connected to the pivot shaft and a second shaft extends through the pivot arm and is connected to the hopper.

In another embodiment of the invention, the battery grid plate support includes a conveyor belt Additional features will become apparent to those skilled in the art upon consideration of the following detailed description of embodiments of the invention and accompanying drawings.

DETAILED DESCRIPTION OF EMBODIMENTS OF THE INVENTION

Figure 1:
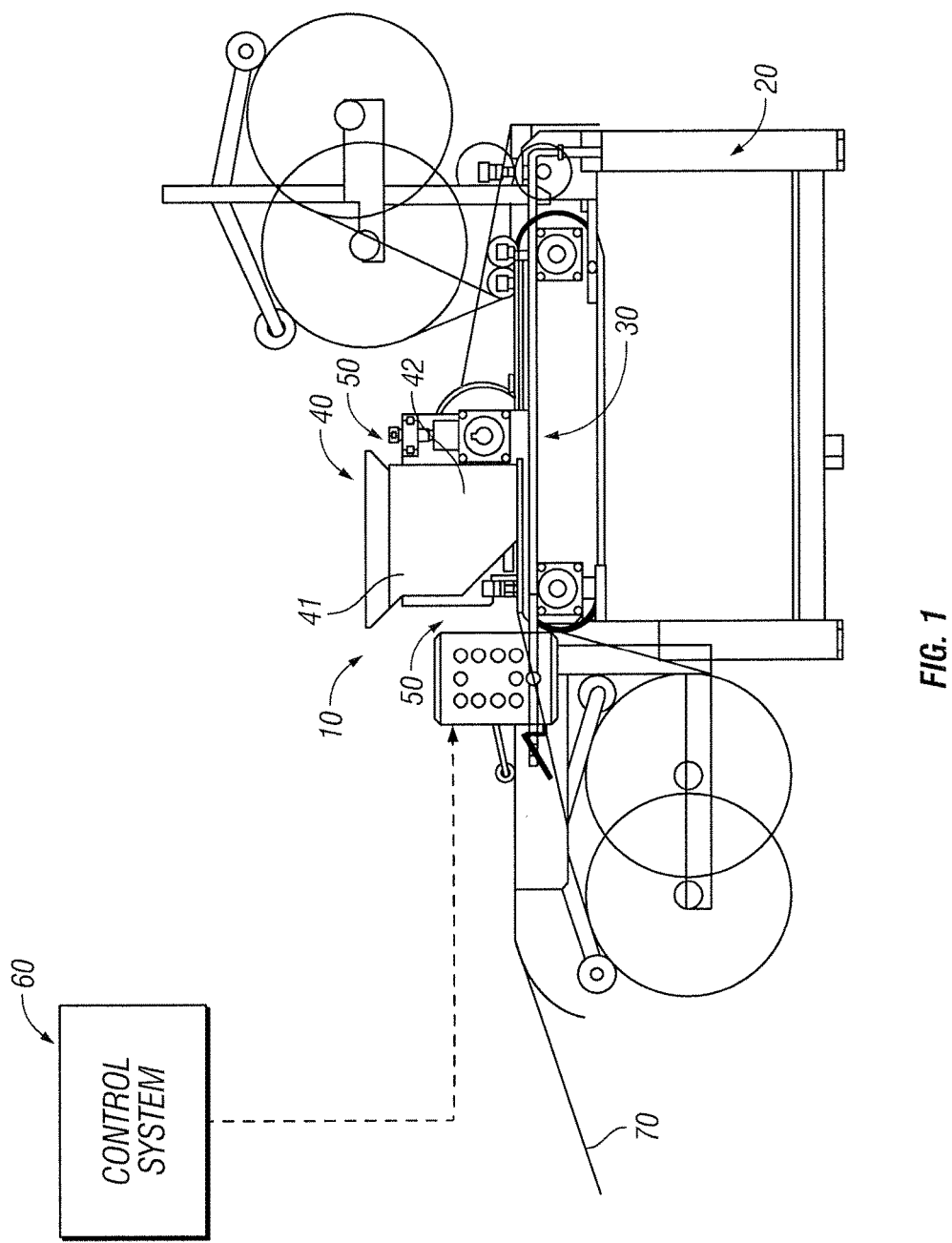
FIG. 1 is a side view of a battery grid pasting machine according to one embodiment of the present invention.

FIG. 1 illustrates a battery grid pasting machine according to one embodiment of the present invention. Pasting machine 10 generally includes a support structure 20, a conveyer belt 30 driven by one or more motors (not shown), a paste dispensing mechanism or hopper 40, height adjustment mechanisms 50 and control system 60.

Figure 3:
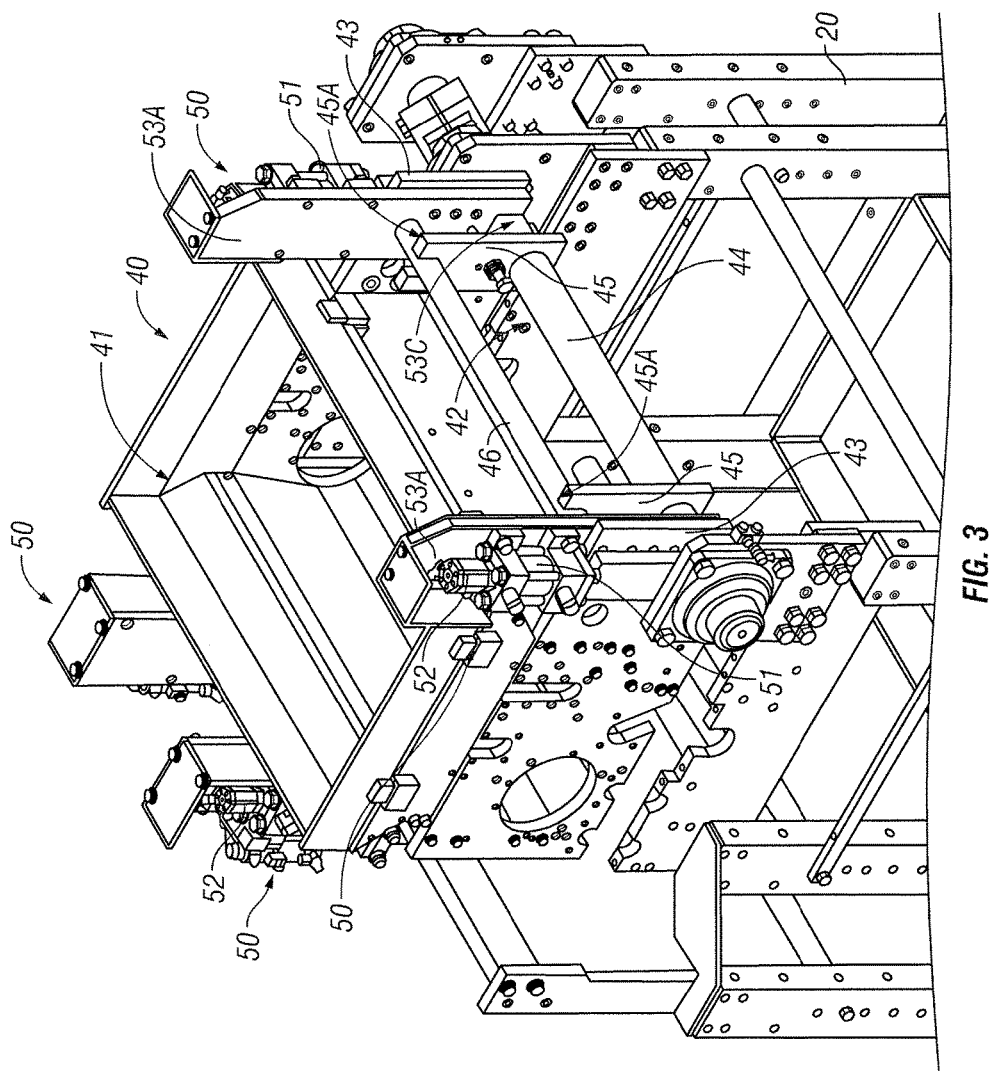
FIG. 3 is a perspective view of a hopper and height adjustment mechanism that are components of the battery grid pasting machine shown in FIG. 1.

Referring to FIGS. 1 and 3, hopper 40 includes a first or inlet end 41 for receiving battery paste, a second or outlet end 42 for dispensing battery paste from hopper 40, a pivot shaft 44 about which hopper 40 moves (as described below) and one or more hopper side plates 43 for mounting hopper 40 to support structure 20 of pasting machine 10. Hopper 40 is positioned above conveyer belt 30 such that there is a space or gap between the upper surface of conveyor belt 30 and outlet end 42 of hopper 40.

Figure 2:
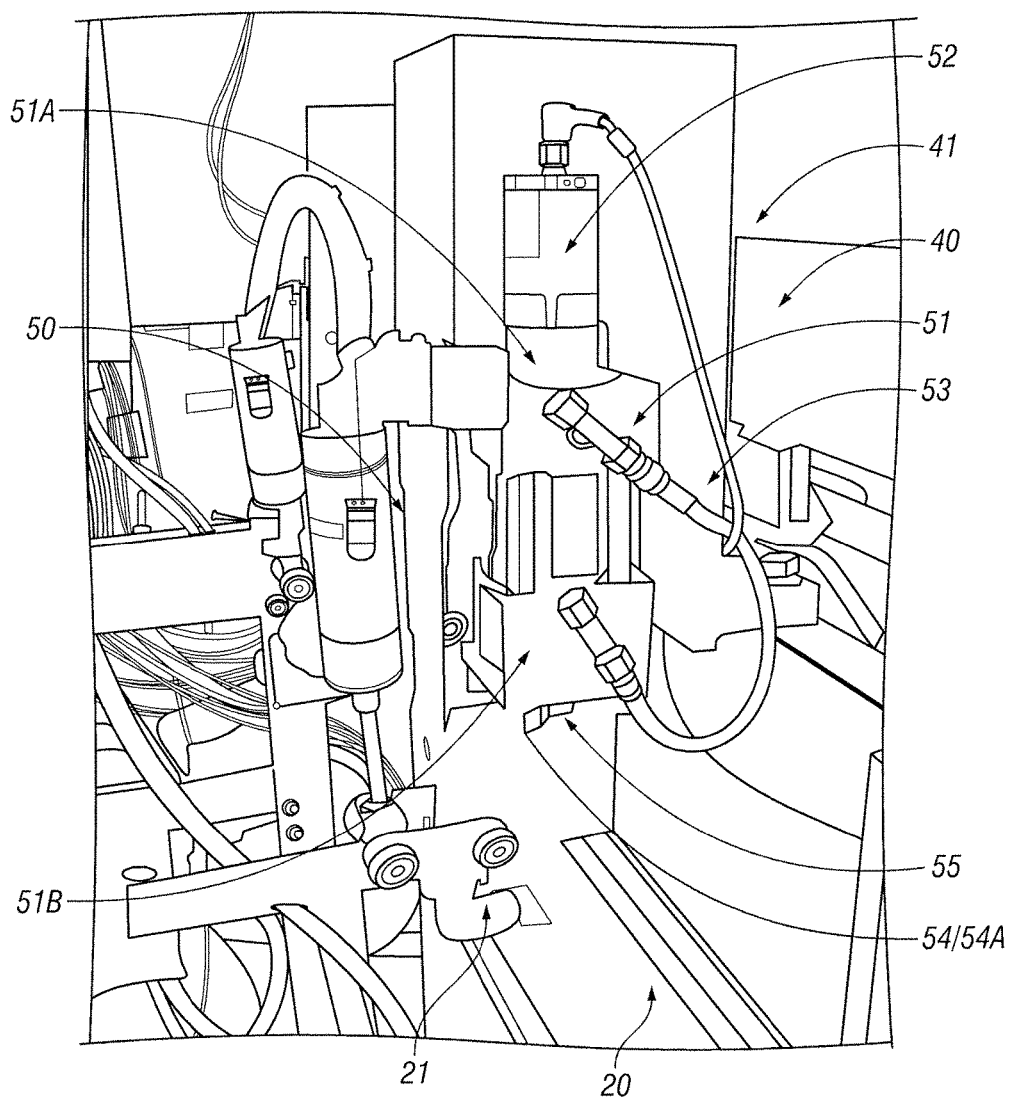
FIG. 2 is a perspective view of a hopper inlet end height adjustment mechanism that is a component of the battery grid pasting machine shown in FIG. 1.

Referring to FIG. 2, one or more height adjustment mechanisms 50 is located at or near inlet end 41 of hopper 40. In one embodiment of the invention, a height adjustment mechanism 50 is located at or near each corner of inlet end 41 of hopper 40. Each inlet end height adjustment mechanism 50 generally includes a hydraulic cylinder 51, a position sensor 52 and a bracket 53, which is connected to hopper 40. Each hydraulic cylinder 51 has a first end 51A and a second end 51B through which a rod 54 having a first end 54A may be extended and retracted. In one embodiment of the invention, hydraulic cylinders 51 have a 1" stroke length. Each inlet end hydraulic cylinder 51 is connected to a bracket 53. First end 54A of rod 54 is, in the embodiment shown, connected to a block 55 that rests on a portion of support structure 20 and is held in place by a clamping structure 21. Note that clamping structure 21 can be disengaged if desired to allow hopper 40 to be pivoted away from the remainder of pasting machine 10 to allow for servicing pasting machine 10 and for other purposes. Because first end 54A of rod 54 is fixed in place on support structure 20, the remainder of hydraulic cylinder 51 will be raised as rod 54 is extended and lowered as rod 54 is retracted. This in turn will raise or lower bracket 53 and inlet end 41 of hopper 40. Position sensors 52 are, in the embodiment shown, mounted to cylinders 51. In one embodiment of the invention, position sensors 52 are transducers. Position sensors 52 may be used to determine the position of hydraulic cylinders 51 and hopper 40 as described below.

Figure 4:
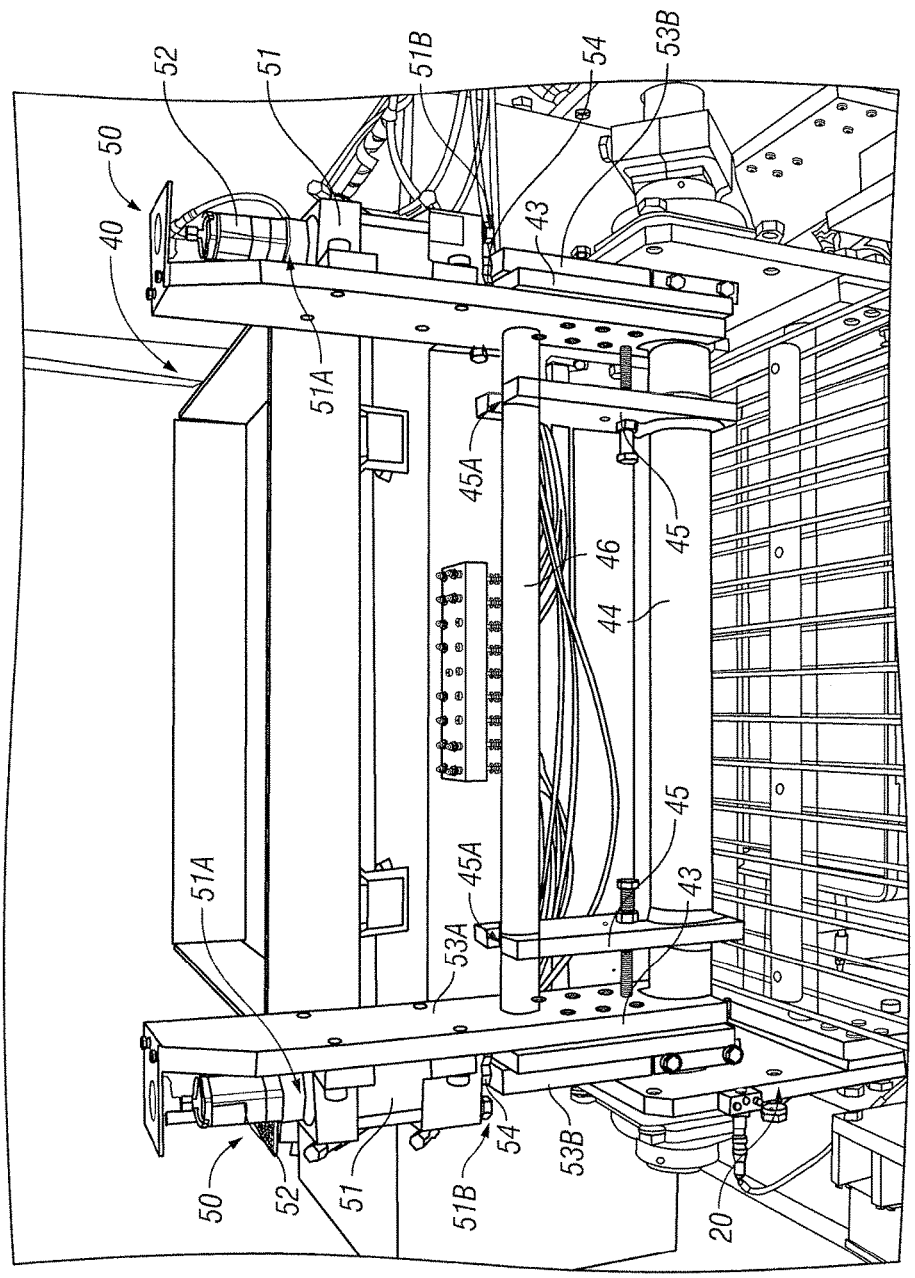
FIG. 4 is a front view of the outlet end of the hopper and a hopper outlet end height adjustment mechanism that are components of the battery grid pasting machine shown in FIG. 1.

Referring to FIGS. 3 and 4, one or more height adjustment mechanisms 50 is located at or near outlet end 42 of hopper 40. In one embodiment of the invention, a height adjustment mechanism 50 is located at or near each corner of outlet end 42 of hopper 40. Each outlet end height adjustment mechanism 50 generally includes a hydraulic cylinder 51, a position sensor 52 and a bracket 53A, which is connected to a hopper side plate 43 such that bracket 53A and hopper side plate 43 move together. Each hydraulic cylinder 51 has a first end 51A and a second end 51B through which a rod 54 having a first end 54A may be extended and retracted. In one embodiment of the invention, hydraulic cylinders 51 have a 1" stroke length. Each outlet end hydraulic cylinder 51 is connected to a bracket 53A. First end 54A of rod 54 is, in the embodiment shown, connected to a bracket 53B, which is connected to pivot shaft 44, which is in turn connected to support structure 20 of pasting machine 10. Pivot shaft 44 extends through slots 53C in bracket 53A and hopper side plate 43 to allow for vertical movement of hopper 40 independent of pivot shaft 44. Two pivot arms 45 are connected to pivot shaft 44. Each pivot arm 45 has a slot 45A through which a hopper shaft 46 passes. Hopper shaft 46 is connected at each end to hopper side plate 43. Note that slots 45A permit hopper shaft 46 to be moved vertically with hopper 40 independent of pivot arms 45. When clamping structure 21 is disengaged and hopper shaft 46 is located in slots 45A of pivot arms 45, rotation of pivot shaft 44 will cause pivot arms 45 to bear against hopper shaft 46, thereby causing hopper 40 to pivot about pivot shaft 44. Because first end 54A of rod 54 is fixed in place to pivot shaft 44 via bracket 53B, the remainder of hydraulic cylinder 51 will be raised as rod 54 is extended and lowered as rod 54 is retracted. This in turn will raise or lower bracket 53A and hopper side plate 43, thereby causing outlet end 42 of hopper 40 to move up and down. Position sensors 52 may be used to determine the position of hydraulic cylinders 51 and hopper 40 as described below.

Figure 5:
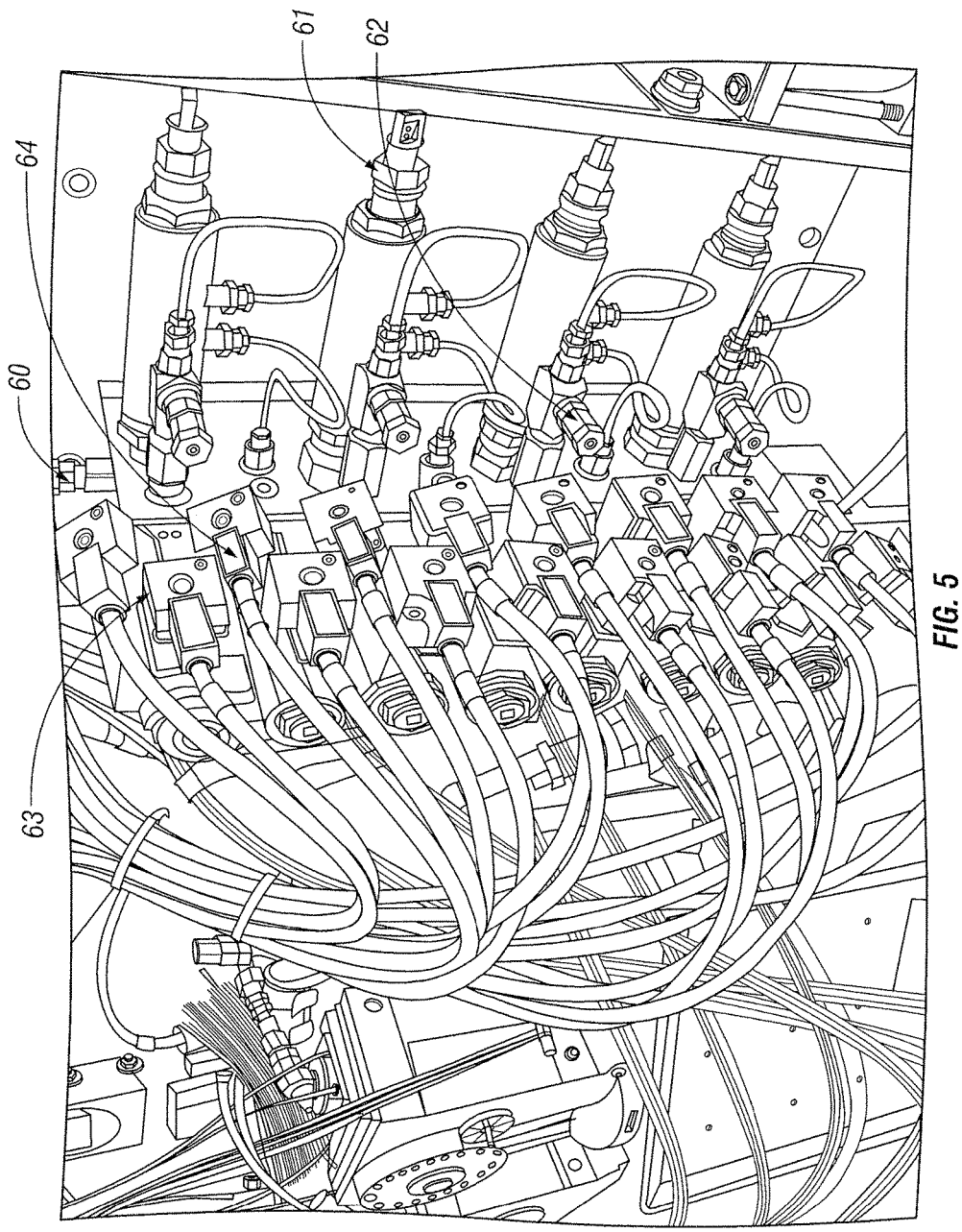
FIG. 5 is a perspective view of a control system that is a component of the battery grid pasting machine shown in FIG. 1.

Referring to FIG. 5, control system 60 includes a first set of hydraulic injector pumps 61, a second set of hydraulic injector pumps 62, a first set of hydraulic valves 63, a second set of hydraulic valves 64 and a microprocessor 65 with a monitor 66. One hydraulic injector pump 61, one hydraulic injector pump 62, one hydraulic valve 63 and one hydraulic valve 64 is associated with each hydraulic cylinder 51. Hydraulic injector pumps 61 and 62 inject a fixed volume of fluid into each hydraulic cylinder 51. Hydraulic injector pumps 61 are used in connection with hydraulic valves 63 for coarse adjustments to the position of hopper 40 and hydraulic injector pumps 62 are used in connection with hydraulic valves 64 for fine adjustments to the position of hopper 40. For example, in certain embodiments of the present invention, each actuation of a hydraulic injector pump 61 adjusts the position of hopper 40 by approximately 0.015" and each actuation of a hydraulic injector pump 62 adjusts the position of hopper 40 by approximately 0.001". The system also may include check valves to trap fluid in hydraulic cylinders 51, preventing any movement of hopper 40 other than when an adjustment is intended to be made.

Battery grid plates 70 are supported on conveyor belt 30 and fed into pasting machine 10 in a generally continuous strip and pass under hopper 40 such that the upper surface of grid plates 70 are spaced apart from the outlet end 42 of hopper 40. The spacing between outlet end 42 of hopper 40 and the upper surface of grid plates 70 controls the thickness of battery paste applied to grid plates 70. Height adjustment mechanism 50 and control system 60 can be utilized to maintain the desired spacing between outlet end 42 of hopper 40 and the upper surface of grid plates 70. For example, in one embodiment of the invention, position sensors 52 produce signals indicative of the position of hydraulic cylinders 51 and hopper 40. These signals can be displayed on monitor 66 of processor 65 for use by an operator of pasting machine 10. In this manner, the operator can manually adjust the position of hopper 40 as needed to maintain the desired coating thickness of the battery paste.

In another embodiment of the present invention, processor 65 of control system 60 can be programmed to utilize the signals produced by position sensors 52 to automatically adjust the position of hopper 40 based on, for example, the dimensions of the grid plate 70 to be coated or the specific paste being applied. Processor 65 can also be programmed to utilize the signals from position sensors 52 to continuously adjust the position of hopper 40, thereby maintain consistent spacing between hopper 40 and the upper surface of grid plates 70 even if there are variations in the surface and/or thickness of grid plates 70.

In other embodiments of the invention, the signals from position sensors 52 can be used to monitor unintended movement of hopper 40, such as could be caused by a worn seal or other mechanical issue, and to automatically correct the position of hopper 40.

Although the present invention has been shown and described in detail, the same is to be taken by way of example only and not by way of limitation. Various alterations and modifications can be made to the embodiments discussed above without departing from the spirit and scope of the invention. For example, the invention has been described in connection with a battery pasting machine that utilizes a conveyor belt to support and move the battery grid plates. However, the invention can also be used in connection with battery pasting machines that do not utilize a conveyor belt.

What is claimed is:
1. A battery grid pasting machine, including:
a support structure;
a battery grid plate support for supporting a battery grid plate;
a paste dispensing hopper connected to the support structure, the hopper having an inlet end and an outlet end, the hopper located above the battery grid plate support with the outlet spaced apart from the battery grid plate support;

a height adjustment mechanism for adjusting the spacing between the outlet end of the hopper and the battery grid plate support, the height adjustment mechanism including a first hydraulic cylinder, a first bracket connecting the first hydraulic cylinder to the hopper adjacent the inlet end of the hopper, a first position sensor for sensing the position of the first hydraulic cylinder, a second hydraulic cylinder, a second bracket for connecting the second hydraulic cylinder to the hopper adjacent the outlet end of the hopper and a second position sensor for sensing the position of the second hydraulic cylinder;

a pivot shaft about which the hopper pivots, the pivot shaft connected to the support structure and extending through a slot in the second bracket, at least one pivot arm connected to the pivot shaft and a second shaft extending through a slot in the pivot arm and connected to the second bracket such that rotation of the pivot shaft rotates the pivot arm so as to bear against the second shaft, thereby causing the hopper to pivot; and a control system for controlling the height adjustment mechanism, the control system including a microprocessor, a first pair of hydraulic pumps and a first pair of hydraulic valves associated with the first pair of hydraulic pumps for incrementally moving the first and second hydraulic cylinders by a first specified distance, a second pair of hydraulic pumps and a second pair of hydraulic valves associated with the second pair of hydraulic pumps for incrementally moving the first and second hydraulic cylinders by a second specified distance that is less than the first specified distance.

2. The battery grid pasting machine according to claim 1, wherein the hopper moves vertically independent of the pivot shaft.

3. The battery grid pasting machine according to claim 1, wherein the hopper moves vertically independent of the pivot arm.

4. The battery grid pasting machine according to claim 1, wherein the battery grid plate support includes a conveyor belt.

5. A battery grid pasting machine, including:
a support structure;
a battery grid plate support for supporting a battery grid plate;
a paste dispensing hopper located above the battery grid plate support;
a height adjustment mechanism for adjusting the spacing between the hopper and the battery grid plate support, the height adjustment mechanism including a hydraulic cylinder connected to the hopper and a position sensor for sensing the position of the hydraulic cylinder; and
a control system for controlling the height adjustment mechanism, the control system including a first hydraulic pump and a first hydraulic valve associated with the first hydraulic pump for incrementally moving the hydraulic cylinder by a first specified distance and a second hydraulic pump and a second hydraulic valve associated with the second hydraulic pump for incrementally moving the hydraulic cylinder by a second specified distance.

6. The battery grid pasting machine according to claim 5, wherein the first specified distance is greater than the second specified distance.

7. The battery grid pasting machine according to claim 5, wherein the control system further includes a microprocessor.

8. The battery grid pasting machine according to claim 5, further including a check valve associated with the hydraulic cylinder.

9. The battery grid pasting machine according to claim 5, wherein the hopper is pivotally connected to the support structure.

10. The battery grid pasting machine according to claim 9, wherein the hopper includes an inlet end and an outlet end and the hopper is pivotally connected to the support structure adjacent the outlet end.

11. The battery grid pasting machine according to claim 10, further including a pivot shaft connected to the support structure.

12. The battery grid pasting machine according to claim 11 further including at least one pivot arm connected to the pivot shaft and a second shaft extending through the pivot arm and connected to the hopper.

13. The battery grid pasting machine according to claim 12, wherein the pivot arm includes at least one slot and the second shaft extends through the slot.

14. The battery grid pasting machine according to claim 5, wherein the battery grid plate support includes a conveyor belt.

* * * * *